US012234434B2

(12) United States Patent
Martin, Jr. et al.

(10) Patent No.: US 12,234,434 B2
(45) Date of Patent: Feb. 25, 2025

(54) METHODS FOR MODIFYING A HOP FLAVOR PROFILE (71) Applicant: ABX INVESTMENTS INC., Tustin, CA (US)

(72) Inventors: Thomas J. Martin, Jr., Tustin, CA (US); Marcos A. Ojeda, Tustin, CA (US); Iain W. H. Oswald, Tustin, CA (US); Kevin A Koby, Tustin, CA (US)

(73) Assignee: Abstrax Tech Inc., Tustin, CA (US)

( * ) Notice: Subject to any disclaimer, the term of this patent is extended or adjusted under 35 U.S.C. 154(b) by 0 days.

(21) Appl. No.: 18/095,209

(22) Filed: Jan. 10, 2023

(65) Prior Publication Data

US 2024/0002758 A1    Jan. 4, 2024

Related U.S. Application Data (60) Provisional application No. 63/344,934, filed on May 23, 2022.

(51) Int. Cl.
*C12C 3/00* (2006.01)
*C12C 3/08* (2006.01)
*C12C 5/02* (2006.01)

(52) U.S. Cl.
CPC ............... *C12C 9/025* (2013.01); *C12C 3/08* (2013.01); *C12C 5/026* (2013.01)

(58) Field of Classification Search
CPC ............ C12C 9/026; C12C 3/08; C12C 5/026
See application file for complete search history.

(56) References Cited

U.S. PATENT DOCUMENTS

| 3,436,319 | A |   | 4/1969  | Von Horst et al. |
|-----------|---|---|---------|------------------|
| 3,979,527 | A | * | 9/1976  | Laws .................. C12C 3/00 |
|           |   |   |         | 426/492 |
| 4,344,978 | A |   | 8/1982  | Sharpe et al. |
| 2018/0291318 | A1 | * | 10/2018 | Byelashov ............. C12C 7/287 |
| 2020/0048590 | A1 |   | 2/2020  | Wolinska |
| 2021/0106036 | A1 |   | 4/2021  | Jurado et al. |

FOREIGN PATENT DOCUMENTS

CA    3016078 C  *  9/2019  ........... B01D 11/028

OTHER PUBLICATIONS

International Search Report and Written Opinion on PCT/US2023/023068 dated Aug. 11, 2023 (14 pages).
Cermak et al., "Strong antimicrobial activity of xanthohumol and other derivatives from hops (*Humulus lupulus* L.) on gut anaerobic bacteria", APMIS, vol. 125, No. 11, Nov. 2017, pp. 1033-1038.

(Continued)

*Primary Examiner* — Vera Stulii
(74) *Attorney, Agent, or Firm* — Foley & Lardner LLP (57) ABSTRACT A method of purifying a hop raw material includes subjecting the hop raw material to a first processing step to form a hop oil extract substantially free of lipids, waxes, flavonoids, and plant matter, collecting the hop oil extract, and optionally subjecting the hop oil extract to a second processing step to yield a purified hop oil product.

15 Claims, 3 Drawing Sheets

(56) References Cited

OTHER PUBLICATIONS

Hilab, Fully Automatic Continuous Feeding Discharging Short Path Molecular Distillation Wiped/Thin Film Evaporator, retrieved from https://hjlabonline.com/products/fully-automatic-continuous-feeding-discharging-short-path-molecular-distillation-wiped-thin-film-evaporator, on Jun. 21, 2024, 5 pages.

Pope Scientific, Inc., "Wiped Film Molecular Cannabinoid & Terpene Distillation", retrieved from https://www.popecannabisdistillation.com/resources/how-it-works/wiped-film-technology/, on Jun. 21, 2024, 8 pages.

Wainer et al, "Extraction of Essential Oils from Lavandula × intermedia 'Margaret Roberts' Using Steam Distillation, Hydrodistillation, and Cellulase-Assisted Hydrodistillation: Experimentation and Cost Analysis", Plants, vol. 11, No. 24, 3479, Dec. 12, 2022, pp. 1-13.

* cited by examiner

METHODS FOR MODIFYING A HOP FLAVOR PROFILE

CROSS REFERENCE TO RELATED APPLICATIONS

This application claims the benefit of U.S. Provisional Application No. 63/344,934, filed May 23, 2022, the disclosure of which is incorporated herein by reference in its entirety.

FIELD

The present technology generally relates to hop flavoring materials and methods of extracting, separating, and collecting hops extract and hops essential oil(s). In particular, the present technology relates to methods for extracting and modulating the content of effective components from hop raw material and to a methods of using the extracted hop materials as flavorants.

BACKGROUND

The following discussion is provided to aid the reader in understanding the disclosure and is not admitted to describe or constitute prior art thereto.

Humulus lupulus, colloquially referred to as hops, produces a wide array of secondary metabolites including bittering acids (such as alpha acids, beta acids, etc.), terpenes, terpenoids, flavorants, and volatile sulfur compounds. There are multiple types of hop extracts including but not limited to: hop essential oils (steam distilled flavor extracts); hop extracts from organic solvents (such as ethanol hop extracts); hop extracted under supercritical conditions ($CO_2$ extracted hop extract); bittering acid extracts (extracts with only bittering acids present); and hop oils (the byproduct of bittering acid extracts). When hops are extracted to capture these important flavoring agents (such as bittering acids or flavoring oils), there is a significant portion of undesirable components such as fats, waxes, lipids, flavonoids, and other plant matter. These other components are undesirable because they make the extract byproduct less flowable, which impedes manufacturing processes and makes the extract more difficult to emulsify due to the varying polarity of the components (flavonoids being polar and lipids being nonpolar). Acids and flavonoids tend to be more polar than terpenoids and flavorants, which would be ineffective to emulsify in a singular mixture. This is not an issue with essential oils due to steam distillation concentrating only the flavoring components, but essential oils tend to be very costly. Recently, supercritical $CO_2$ extraction has become the industrial process of choice for the production of brewery ingredients. However, its use is largely limited to the processing of dry raw materials and compounds of low polarity and low molecular weight. One type of product on the market are hop extract byproducts (i.e. $CO_2$ hop oils) that have the more valuable bittering acids removed, leaving behind a mixture of lipids, waxes, flavorants, flavonoids, and plant matter. When the bittering acids are extracted, the resulting byproduct extract contains significant flavor off notes that impede their ability to be used as a flavoring agent. These extracts typically have a plastic like taste to it that negatively impacts the flavor experience of the final product that was formulated with these extracts. Considering that flavorants are the most desirable aspect of this extract, it is of interest to preserve these compounds while also removing the waxes, lipids, fats, and plant matter that are contributing to the off-notes in the product.

Hops are traditionally used in the brewing process to impart flavor, aroma, and bitterness to alcoholic beverages such as beer. This process results in a large amount of biomass waste from the hops as they are removed from the final product and disposed of. Additionally, the aroma and flavors of different vintages of hop can be highly variable due to environmental conditions. Furthermore, the use of hops results in incorporation of bittering acids into the beverage that is difficult to control or in some cases, undesirable. Additionally bittering agents are often extracted from hops to create a concentrate that can be used to modify the bitterness of the beverage in a more controlled manner. This process is wasteful, as the hops cannot be used in the brewing process, as well as generates a large amount of biomass waste, as the resulting post-extraction slurry has minimal commercial value.

It would be advantageous to develop efficient ways to extract compounds of value from the biomass waste and for identifying, characterizing, and enhancing the quality and quantity of the extracted compounds. Additionally, there is a real need for a more cost-effective method of imparting the flavor and aromas of hops in a consistent manner, which can also be decoupled from the bittering agents used. The inventions described herein meet that long-felt need.

SUMMARY

In one aspect, a method of purifying a hop raw material is proved. The method may include subjecting the hop raw material to a first processing step to form a hop oil extract substantially free of lipids, waxes, flavonoids, and plant matter, collecting the hop oil extract, and, optionally, subjecting the hop oil extract to a second processing step to yield a purified hop oil product.

In at least one embodiment, the first processing step includes subjecting the raw hop oil to a first distillation, centrifugation, or winterization. In at least one embodiment, the first distillation at a temperature of about 35° C. to about 150° C. In at least one embodiment, the first distillation includes one or more of wiped film distillation, rolled film distillation, falling film distillation, and vacuum distillation. In at least one embodiment, the first distillation includes wiped film distillation. In at least one embodiment, the first distillation is conducted at a temperature of about 35° C. to about 150° C.

In at least one embodiment, the first processing step includes centrifugation followed by separating and removing the supernatant from the precipitate. In at least one embodiment, the first processing step includes winterizing wherein the mixture is cooled to a temperature of about 20° C. to about −80° C. for a time period of about 5 minutes to about 1 hour.

In at least one embodiment, the second processing step comprises one or more of distillation, filtration, evaporation, extraction, centrifugation, and fractionation. In at least one embodiment, the second processing step includes wiped film distillation. In at least one embodiment, the wiped film distillation is conducted at a temperature of about 35° C. to about 150° C.

In at least one embodiment, the raw hop oil is substantially free of bittering-acids. In at least one embodiment, the purified hop oil product has a higher purity of at least one terpene compared to the raw hop oil.

In at least one embodiment, the hop oil extract and/or the purified hop oil product has a lower content of at least one terpene compared to the hop raw material. In at least one embodiment, the at least one terpene includes myrcene, humulene, or caryophyllene. In at least one embodiment, the one terpene includes myrcene.

In at least one embodiment, the purified hop oil product includes a flavor component, an aroma component, or both a flavor and an aroma component.

In another aspect, a method of modulating the myrcene content in hop oil includes mixing a raw hop oil with an alcohol to form a mixture at a temperature from about 20° C. to about −80° C., filtering the mixture to yield a hop oil extract, and removing the alcohol from the hop oil extract in a rotary evaporator for different periods of time to modulate the myrcene content in the hop oil product.

In at least one embodiment, the alcohol is methanol, ethanol, propanol, butanol, and isopropanol, or a combination of any two or more thereof. In at least one embodiment, the alcohol solvent is ethanol. In at least one embodiment, the hop oil extract is subjected to rotary evaporation at a temperature of about 30° C. to about 50° C. for a time period of about 10 minutes to about 30 minutes.

In a further aspect, a method of modulating the content of one or more terpenes in a hop raw material is provided. The method includes subjecting the hop raw material to a first processing step to form a hop oil extract substantially free of lipids, waxes, flavonoids, and plant matter; collecting the hop oil extract; and subjecting the hop oil extract to a second processing step to yield a purified hop oil product. In at least one embodiment, the first processing step comprises subjecting the hop raw material to a first distillation, centrifugation, or winterization. In at least one embodiment, the second processing step comprises subjecting the hop oil extract to wiped film distillation or rotary evaporation.

In at least one embodiment, the one or more terpene includes myrcene, humulene, or caryophyllene. In at least one embodiment, the one or more terpene includes myrcene.

In at least one embodiment, the first processing step and the second processing step both include wiped film distillation. In at least one embodiment, the wiped film distillation is conducted at a temperature of about 35° C. to about 150° C.

In at least one embodiment, the method further includes mixing the raw hop material with a solvent prior to the first processing step. In at least one embodiment, the solvent includes a hydrocarbon, an ether, a terpene, an alcohol, or a combination of any two or more thereof. In at least one embodiment, the solvent includes methanol, ethanol, propanol, butanol, isopropanol, acetic acid, chloroform, diethyl ether, dichloromethane, ethyl acetate, methylene chloride and carbon disulfide, butane, pentane, hexane, or a combination of any two or more thereof. In at least one embodiment, the solvent includes butane. In at least one embodiment, the solvent includes ethanol. In at least one embodiment, the separating includes filtering the cooled mixture to separate the first phase from the second phase. In at least one embodiment, the solvent is removed by distillation, rotary evaporation, column separation, devolatilization, or a combination of any two or more thereof. In at least one embodiment, the distillation comprises one or more of wiped film distillation, rolled film distillation, falling film distillation, simple distillation, or vacuum distillation. In at least one embodiment, the solvent is removed by rotary evaporation to yield the hop oil having the higher concentration of the desired constituent. In at least one embodiment, the method further includes removing the solvent by rotary evaporation at a temperature of between about 30° C. to about 50° C. for a period of about 10 minutes to about minutes.

In at least one embodiment, the winterizing or freezing includes cooling the mixture to induce the phase separation, where the second phase is a solid phase. In at least one embodiment, the hop oil mixture is cooled to a temperature of about 20° C. to about −80° C. for a time period of about 5 minutes to about 1 h (60 minutes). In at least one embodiment, the winterization comprises cooling the mixture to a temperature of about 20° C. to about −80° C. for a time period of about 5 minutes to about 1 hour to induce phase separation into a first phase comprising the solvent and hop oil extract and a second phase comprising polar constituents from the hop oil.

In at least one embodiment, the raw hop oil is substantially free of bittering-acids. In at least one embodiment, the purified hop oil product has a higher purity of at least one terpene compared to the raw hop oil. In at least one embodiment, the purified hop oil product includes one or more flavor and/or aroma components. In at least one embodiment, the desired constituent is a terpene. In at least one embodiment, the desired constituent includes one or more terpenes selected from myrcene, humulene, and caryophyllene.

In at least one embodiment, the methods further includes blending the purified hop oil product with at least one terpene and/or terpenoid. In at least one embodiment, at least one terpene or terpenoid includes one or more of α-bisabolol, borneol, camphene, camphor, β-caryophyllene, γ-3-carene, caryophyllene oxide, α-cedrene, β-eudesmol, fenchol, geraniol, guaiol, α-humulene, isoborneol, limonene, linalool, menthol, myrcene, nerol, cis-ocimene, trans-ocimene, α-phellandrene, α-pinene, β-pinene, sabinene, α-terpinene, α-terpineol, terpinolene, α-guaiene, elemene, farnesene, germacrene, guaiol, pinanol, selina-3,7(11)-diene, eudesm-7(11)-en-4-ol, and valencene.

In yet another aspect, a purified hop oil product is provided which is obtained by the methods described in various aspects and embodiments.

In a further aspect, a blend is provided that includes the purified hop oil product and at least one compound having a flavor or fragrance; wherein the at least one compound is a terpene or terpenoid. Another aspect relates to a method of using the purified hop oil product in a flavor application, a food application, or a beverage application.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE DRAWINGS

The disclosure will become more fully understood from the following detailed description, taken in conjunction with the accompanying figures, in which.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Features may be described herein as part of the same or separate aspects or embodiments of the present technology for the purpose of clarity and a concise description. It will be appreciated by the skilled person that the scope of the present technology may include embodiments having combinations of all or some of the features described herein as part of the same or separate embodiments.

The following terms are used throughout and are as defined below.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. As a non-limiting example, a reference to "X and/or Y" can refer, in one embodiment, to X only (optionally including elements other than Y); in another embodiment, to Y only (optionally including elements other than X); in yet another embodiment, to both X and Y (optionally including other elements).

Unless indicated otherwise, reference to "percent" is to be understood as "weight percent," and reference to "ratio" is as a weight/weight ratio.

As used herein, the term "terpene compound" is understood to mean any organic compound that contains at least one isoprene subunit within its structure and their oxygenated derivatives.

As used herein, the terms "odor" and "aroma" are used interchangeably and represent the sensory attributes of certain substances perceptibly determined by the olfactory system.

As used herein, the term "flavoring agent" is understood to mean an additive that is meant to improve the taste or aroma impression of food or other substances, and can include both natural and synthetic ingredients.

Humulus lupulus is referred to hops herein after for ease, they are used interchangeably.

As used herein, the term "flavorant" is colloquially used herein to describe all desirable flavoring aspects, including but not limited to terpenes, terpenoids, volatile organic sulfur compounds, and other flavorant compounds such as those that may (but are not required to) have a FEMA, IFRA, and/or JECFA number associated.

As used herein, the term "substantially free" may refer to a composition that has little or no content of the stated component. For instance, "substantially free of bittering-acids" refers to a composition that has little or no bittering-acids, e.g., the content of bittering-acids is less than 5 wt. %, preferably less than 1 wt. %, most preferably less than 0.5 wt. % based on the weight of the composition. Likewise, a composition "substantially free of lipids, waxes, flavonoids, and plant matter," indicates that the composition that has little or no lipids, waxes, flavonoids, and plant matter, such as less than 5 wt. %, preferably less than 1 wt. %, most preferably less than 0.5 wt. % based on the weight of the composition. In some embodiments, the composition is free of the stated component.

Various embodiments of the present technology described herein relates to methods for extraction, separation, recovery and/or purification of various hop, hemp and cannabis materials. The methods aim to provide efficient and cost-effective methods for separation of various components from hops, hop extracts, hop biomass and/or hop byproducts, as well as hemp and cannabis extracts and products. During the course of development of efficient methods for hops extraction, the inventors found that the biomass slurry that is produced from the extraction process of bittering agents of hops is not ideal for use as a flavoring agent in products, such as beverages. This is primarily for three reasons—first, the slurry contains a large amount of fats, lipids, and waxes that impart flavor off-notes that are undesirable; second, the large fraction of lipids, waxes, and fats results in strong phase separation within the beverage, even under strict emulsifying conditions; and lastly, the large volume needed to impart the desired flavors results in a greater-than-desired amount necessary. This leads to issues related to the use of the hop biomass, as the larger quantities impart more undesirable flavors and aromas to the consumer product.

As provided below, this technology is predicated upon the discovery by the inventors of efficient methods for removing the parts of the hop extracts that express the undesirable off-notes which also leads to an end product that is more flowable and is able to be emulsified for water soluble applications (e.g., beverages, candy, food, flavoring, etc.). In addition, the process in accordance with the present technology has been found to selectively reduce the myrcene content in various oils, such as hop oil, which allows manufacturers the opportunity to impart more unique flavors to their products. The inventors discovered that the methods could be effectively applied to hemp and cannabis as well. The present inventors have discovered novel methods of converting a downstream waste product into a highly valuable flavor/fragrance product.

Methods

The methods below are described with respect to hop raw material, but they are applicable to purification and content modulation of various hemp and cannabis products as well.

Aspects of the present technology relate to methods of purifying hop raw material, which includes processing a hop raw material through various steps to remove any undesirable components and modulating the content of desirable components.

In one aspect, a method purifying a hop raw material is provided. The method may include subjecting the hop raw material to a first processing step under conditions suitable to remove undesirable materials, including, without limitation, lipids, waxes, plant material, and flavonoid materials. The method may further include separating and subjecting the hop oil extract to a second processing step to yield a purified hop oil product.

The hop raw material may include the starting raw material (i.e. the active plant parts such as cones, where concentrated extracts have not yet been extracted), the botanically derived isolates, or the biomass that results after the extraction process. For example, the hop plant material may be subjected to an extraction process to remove bittering agents and the resulting biomass may be used as the hop raw material. Hop raw material may include hop oil or hop oil extract.

The first processing step suitably converts the hop raw material to a hop oil extract which is substantially free of lipids, waxes, flavonoids, and plant matter. The first processing step may include one or more processes such as winterization, distillation, centrifugation, extraction, fractionation, and the like. The first processing step may include separating the hop oil extract from the undesirable materials, and/or collecting the hop oil extract. The first processing step suitably includes methods such as distillation, centrifugation, and winterization.

The method may further include a second processing step for subjecting the separated hop oil extract to a purification process to yield a purified hop oil product. The second processing step may include one or more processes such as distillation, filtration, evaporation, extraction, centrifugation, fractionation, and the like. Distillation, as used herein, covers all types of distillation, such as e.g., simple distillation, fractional distillation, vacuum distillation, molecular distillation, and the like.

In one aspect, the method includes subjecting hop raw material to a first processing step. The first processing step may include one distillation, centrifugation, or winterization. In at least one embodiment, the first processing step includes distillation. In at least one embodiment, the first processing step includes centrifugation. In at least one embodiment, the first processing step includes winterization. The raw hop oil can be used in the crude form or can be stripped of bittering agents prior to the first processing step. In at least one embodiment, the raw hop oil is substantially free of bittering-acids.

In one aspect, the method includes subjecting hop raw material to processing steps including centrifugation and distillation. In at least one embodiment, the first processing step includes centrifugation. The centrifugation step may include subjecting the hop raw material to centrifugation in a centrifugation device under suitable conditions, such that a significant portion of the lipids, waxes, and plant matter is sedimented and separated. Depending on the amount of hop raw material, suitable centrifugation conditions, such as rpm speed and time can be selected. The centrifuged portion containing oils of interest (supernatant) is separated from the sedimentation layer by suitable methods, e.g., decantation or filtration. This process removes the majority of undesirable components in the extract, resulting in a flowable extract. The centrifugation process described above may leave behind some of the compounds responsible for the off-notes, which can be removed by subjecting the flowable extract to a second processing step. The second processing step may include one or more processes such as distillation, filtration, evaporation, extraction, centrifugation, fractionation, and the like. In at least one embodiment, the raw hop oil is substantially free of bittering-acids.

In one aspect, the method includes subjecting hop raw material to processing steps, which include multiple distillations. In at least one embodiment, the first processing step includes distillation. The first distillation step may include optionally heating the hop raw material to make it flowable (~35° C.), and subjecting it to distillation to remove a significant portion of the lipids, waxes, flavonoids, and plant matter. The distillation temperature may be suitably selected to be in the range of about 20° C. to about 200° C., including, without limitation, about 35° C. to about 150° C., about 40° C. to about 150° C., about 50° C. to about 150° C., about 60° C. to about 130° C., about 70° C. to about 120° C., or any range including and/or in-between any two of these values. The extract obtained following the first distillation may be subjected to a second processing step which may include one or more processes selected from distillation, filtration, evaporation, extraction, centrifugation, fractionation, and the like. Suitable distillation methods may include, without limitation, wiped film distillation, simple distillation, rolled film distillation, falling film distillation, or vacuum distillation. In at least one embodiment, the raw hop oil is substantially free of bittering-acids.

In one aspect, the method includes subjecting hop raw material to winterization and distillation. In at least one embodiment, the first processing step includes winterization. The winterization step may include mixing hop raw material with a low-boiling non-polar solvent under conditions suitable to selectively freeze the more polar compounds that freeze at a higher temperature than the flavorant fraction. Suitable low-boiling non-polar solvent, may include, without limitation, a hydrocarbon, an ether, a terpene, or an alcohol, such as for example, propane, butane, isobutane, pentane, hexane, heptane, benzene, toluene, 1,4-dioxane, xylene, ethylene, carbon tetrachloride, diethyl ether, cyclohexane, methanol, ethanol, propanol, butanol, isopropanol, acetic acid, chloroform, petroleum ether, chloroform, dichloromethane, methylene chloride, carbon disulfide, tetra chloromethane, etc. or a combination of two or more thereof. In at least one embodiment, the non-polar solvent includes propane, butane, isobutane, pentane, hexane, heptane, benzene, toluene, 1,4-dioxane, xylene, ethylene, carbon tetrachloride, diethyl ether. In at least one embodiment, the low-boiling non-polar solvent is butane. In at least one embodiment, the raw hop oil is substantially free of bittering-acids.

The mixing of hop oil with a low-boiling non-polar solvent can be conducted at or below room temperature, and optionally in a sealed environment. For example, hop oil with a low-boiling non-polar solvent can be mixed and the mixture cooled to a temperature at or below ambient temperature, for a suitable time, to induce phase separation into a first phase comprising the solvent and hop oil extract and a second phase comprising polar constituents from the hop oil. The mixture can be cooled to a temperature of about 30° C. or below, e.g., in the range of about 25° C. to about −100° C., such as about 22° C. to about −90° C., about 20° C. to about −80° C., about 15° C. to about −70° C., about 10° C. to about −60° C., such as about 8° C. to about −50° C., about 5° C. to about −30° C., or about 5° C. to about −20° C., or any range including and/or in-between any two of these values. The mixture can be cooled for a time sufficient to induce or achieve phase separation, e.g., up to about 24 hours, including about 1 minute to about 20 hours, about 2 minutes to about 10 hours, about 5 minutes to about 5 hours, or about 10 minutes to about 1 hour, or any range including and/or in-between any two of these values. In at least one embodiment, the hop oil solvent mixture is cooled to a temperature of about 20° C. to about −80° C. for a time period of about 5 minutes to about 1 hour.

In at least one embodiment, the hop oil mixture can be subjected to cooling, including winterizing or freezing the mixture, to induce the phase separation, where the second phase is a solid phase. The second phase can be separated from the flowable extract by one or more of the processing steps known in the art, e.g., filtration, centrifugation, sedimentation, flocculation, etc. Thus, in at least one embodiment, the separating comprises filtering the cooled mixture to separate the first phase from the second phase. In at least one embodiment, the separated phases may be collected and subjected to further processing. In at least one embodiment, the first phase may include the hop oil extract. The separated and collected extract is further processed to remove the non-polar solvent, using suitable methods, including, without limitation, heating, distillation, rotary evaporation, column separation, devolatilization, or a combination thereof. For example, the separated or collected extract can be slowly heated up to a suitable temperature to remove the solvent. In at least one embodiment, the non-polar solvent is removed by rotary evaporation to yield the hop oil having the higher concentration of the desired constituent. This process removes the majority of undesirable components in the extract, resulting in a flowable extract. The winterization process described above may leave behind some of the compounds responsible for the off-notes (e.g., fats, waxes, plant material, or flavonoids), which can be removed by subjecting the flowable extract to a second processing step.

The hop oil extract obtained from the first processing step (e.g., centrifugation, distillation or winterization described above, may be used as such or it may be subjected to a second processing step to further purify it by removing the remaining fats, waxes, plant material, or flavonoids. The second processing step may include one or more processes selected from distillation, filtration, evaporation, extraction, centrifugation, fractionation, and the like. In at least one embodiment, the second processing step includes distillation. Suitable distillation methods for the second processing step include, without limitation, molecular distillation, wiped film distillation, rolled film distillation, falling film distillation, simple distillation, vacuum distillation, and the like or combinations thereof. In at least one embodiment, the distillation for the second processing step includes molecular distillation. The distillation step can be conducted in the presence of a suitable solvent including, without limitation, methanol, ethanol, propanol, butanol, isopropanol, acetic acid, chloroform, diethyl ether, dichloromethane, ethyl acetate, methylene chloride, carbon disulfide, and the like or a combination of any two or more thereof. In at least one embodiment, the distillation solvent includes ethanol. Once the extract has been distilled, the off-notes are no longer present, the product is flowable, and the final product is easier to emulsify, allowing for the use in a wide variety of products.

In one aspect, a method is provided including mixing of a raw hop oil comprising the desired constituent with a non-polar solvent to form a mixture; cooling the mixture to a temperature at or below ambient temperature to induce phase separation into a first phase comprising the solvent and hop oil extract and a second phase comprising polar constituents from the hop oil; separating the first phase from the second phase; and removing the solvent from the first phase to yield a purified hop oil product having a higher concentration of the desired constituent compared to a concentration of the desired component in the raw hop oil.

In at least one embodiment, the method serves to enrich hop oil with a desired constituent. The desired constituent may include one or more flavor and/or aroma component. For example, the desired constituent may include hydrocarbons, e.g., monoterpenes and sesquiterpenes or oxygenated forms thereof sulfur-containing compounds, e.g., thiols, sulfides, polysulphides, thioesters, and thiophenes; and flavorant compounds, e.g., alcohols, ketones, esters, and the like. Suitable desired constituents may include, without limitation, myrcene, limonene, humulene, caryophyllene, farnesene, selinene, yiagene, copaene, muurolene, linalool, geraniol, caryophyllene oxide, 2-methyl-3-butene-2-ol, and farnesol, methyl geraniate, citronellol, iso-amyl iso-butyrate, 2-methyl-3-butene-2-ol, 3-mercaptohexan-1-ol, and the like or a combination of any two or more thereof. In at least one embodiment, the desired component includes one or more of β-myrcene, α- and β-pinene, α-humulene, β-farnesene, β-caryophyllene, α- and β-selinene, and γ-muurolene, or a combination of any two or more thereof. In at least one embodiment, the desired component includes myrcene. In at least one embodiment, the purified hop oil has a higher purity of at least one terpene compared to the hop raw material. In at least one embodiment, the purified hop oil has a higher purity of myrcene compared to the hop raw material.

In at least one embodiment, the methods described herein provide hop oil extract and/or the purified hop oil product which has a lower content of at least one terpene compared to the hop raw material. In at least one embodiment, the methods described herein provide hop oil extract and/or the purified hop oil product having a lower content of one or more terpene selected from myrcene, humulene, or caryophyllene, compared to the hop raw material.

In at least one embodiment, the methods described herein provide hop oil extract and/or the purified hop oil product having a higher purity of at least one terpene compared to the hop raw material.

The methods described herein may be conducted in the presence or absence of a solvent. The non-polar solvent and distillation solvents used in the method may include a hydrocarbon, an ether, a terpene, or an alcohol. Suitable non-polar solvents are listed herein and may include, without limitation, propane, butane, isobutane, pentane, hexane, heptane, benzene, toluene, 1,4-dioxane, xylene, ethylene, carbon tetrachloride, diethyl ether, or a combination of any two or more thereof. Suitable distillation solvents are listed herein and may include, without limitation, methanol, ethanol, propanol, butanol, isopropanol, acetic acid, chloroform, diethyl ether, dichloromethane, ethyl acetate, methylene chloride, carbon disulfide, or a combination of any two or more thereof. In at least one embodiment, prior to first processing step, the hop raw material is combined with a solvent comprising methanol, ethanol, propanol, butanol, isopropanol, propane, butane, isobutane, pentane, hexane, heptane, acetic acid, chloroform, diethyl ether, dichloromethane, ethyl acetate, methylene chloride, or carbon disulfide. Alternatively, the methods disclosed herein can be conducted in the absence of any solvent.

The purified or enriched hop oil product obtained by the methods described herein may be further blended with other suitable flavor and/or aroma components. In at least one embodiment, the method may include blending or combining the purified or enriched hop oil product with one or more terpenes and/or terpenoids and/or other flavorants to give varietal specific flavor notes to directly emulate the flavor/aroma notes of specific hops, such as e.g., Citra®, Mosaic®, Centennial, Chinook, Williamette, and the like. In any of the above embodiments, the purified or enriched hop oil product may be blended with at least one terpene or terpenoid including, without limitation, α-bisabolol, borneol, camphene, camphor, β-caryophyllene, γ-3-carene, caryophyllene oxide, α-cedrene, β-eudesmol, fenchol, geraniol, guaiol, α-humulene, isoborneol, limonene, linalool, menthol, myrcene, nerol, cis-ocimene, trans-ocimene, α-phellandrene, α-pinene, β-pinene, sabinene, α-terpinene, α-terpineol, terpinolene, α-guaiene, elemene, farnesene, germacrene, guaiol, pinanol, selina-3,7(11)-diene, eudesm-7(11)-en-4-ol, valencene, or a combination of any two or more thereof.

In one aspect, a method is provided including subjecting the hop raw material to a first processing step to form a hop oil extract substantially free of lipids, waxes, flavonoids, and plant matter; collecting the hop oil extract; and subjecting the hop oil extract to a second processing step to yield a purified hop oil product. The first processing step may include subjecting the hop raw material to distillation, centrifugation, or winterization which are described herein. The second processing step may include subjecting the hop oil extract to one or more of distillation, filtration, evaporation, extraction, centrifugation, and fractionation. In at least one embodiment, the second processing step may include subjecting the hop oil extract to wiped film distillation or rotary evaporation. The method serves to modulate the content of one or more terpenes in a hop raw material, for example, the method may be used to reduce the content of myrcene.

The present methods may be used to modulate, i.e. reduce or enhance, the myrcene content of various products containing myrcene. Thus, one aspect is directed to a method of modulating the myrcene content in hop oil, the method including mixing a raw hop oil with an alcohol to form a mixture at a temperature from about 20° C. to about −80° C.; filtering the mixture to yield a hop oil extract; and removing the alcohol from the hop oil extract by evaporation in a rotary evaporator for different periods of time to modulate the myrcene content in the hop oil product. In at least one embodiment, the modulation includes reducing the content of myrcene. In at least one embodiment, the modulation includes enhancing the content of myrcene. Suitable alcohol solvents may include, without limitation, methanol, ethanol, propanol, butanol, isopropanol, or a combination of any two or more thereof. In at least one embodiment, the alcohol solvent includes ethanol. Suitable evaporation methods may include rotary evaporation at a temperature of about 30° C. to about 50° C., for a time period of about 5 minutes to about 1 hour, including from about 10 minutes to about 45 minutes, about 10 minutes to about 30 minutes, about 10 minutes to about 25 minutes, or about 10 minutes to about 20 minutes.

Aspects of the present technology relate to a purified hop oil product obtained by the methods described herein. The purified hop oil material may be used, alone or in conjunction with other botanically derived isolates, to provide an aroma and/or flavor profile emulating that of hops or other essential oils or products. Other aspects of the present technology relate to a blend which includes the purified hop oil product obtained by methods described herein and at least one compound having a flavor or fragrance. In at least one embodiment, the at least one compound having a flavor or fragrance is a terpene or terpenoid. Suitable compounds having a flavor or fragrance may include, without limitation, α-bisabolol, borneol, camphene, camphor, β-caryophyllene, γ-3-carene, caryophyllene oxide, α-cedrene, β-eudesmol, fenchol, geraniol, guaiol, α-humulene, isoborneol, limonene, linalool, menthol, myrcene, nerol, cis-ocimene, trans-ocimene, α-phellandrene, α-pinene, β-pinene, sabinene, α-terpinene, α-terpineol, terpinolene, α-guaiene, elemene, farnesene, germacrene, guaiol, pinanol, selina-3,7(11)-diene, eudesm-7(11)-en-4-ol, valencene, or a combination of any two or more thereof.

Other aspects of the present technology relate to methods for preparing a semi-synthetic blend; wherein the process comprises: (i) purifying crude hop oil extract to remove any fats, waxes, lipids, flavonoids, or other polar/high freezing point compounds to obtain a purified hop oil; (ii) adding at least one compound having a flavor or fragrance to the purified hop oil, and (iii) preparing a semi-synthetic blend that mimics the flavor or fragrance of the said at least one compound added; wherein at least one compound comprises terpenes or terpenoids.

Yet other aspects of the present technology relate to methods for preparing a semi-synthetic blend; wherein the process comprises: (i) selectively reducing myrcene content in a hop oil or hop extract via purification under low pressure and/or heated applications to obtain a purified hop oil; (ii) adding at least one compound having a flavor or fragrance to the purified hop oil, and (iii) preparing a semi-synthetic blend that mimics the flavor or fragrance of the said at least one compound added; wherein at least one compound comprises terpenes or terpenoids.

The present methods surprisingly and unexpectedly provided selective reduction of myrcene content. For example, the methods described herein may be used to advantageously reduce the myrcene content of various products, including without limitation, hops, cannabis, and hemp. By reducing the levels of myrcene selectively, the methods of the present technology advantageously allow other characteristics of the hop varietal to shine through more effectively. For example, the tropical notes of mosaic become more apparent and the pine notes of centennial become stronger. All hops have a heavy amount of myrcene (a CA prop65 carcinogen) which imparts a strong woody and hoppy note. However, other unique parts of hop varietals shine through when more of myrcene is removed. Based on the desired characteristic, the present methods allow modulation of myrcene content to satisfy both consumers who want the authentic true to type characteristic of that hop varietal, and those that may want a product with reduced myrcene content for health reasons or for reduced woody note.

The present technology, thus generally described, will be understood more readily by reference to the following examples, which are provided by way of illustration and are not intended to be limiting of the present technology.

EXAMPLES

Various embodiments will be further clarified by the following examples, which are in no way intended to limit this disclosure thereto.

Example 1: Purification of Hop Oil (Double Distillation)

1200 ml of crude hop oil raw material is loaded in to a wiped film distillation unit which is run at 70° C. and under a vacuum of about 25 torr. Once a significant portion of the lipids, waxes, flavonoids, and plant matter has been removed via distillation, the resulting hop oil is collected. The collected hop oil extract is then processed through wiped film distillation again, which is run at 70° C. and under a vacuum of about 25 torr to further remove any remaining lipids, waxes, flavonoids, and plant matter.

Example 2: Purification of Hop Oil (Winterization and Distillation)

100 ml of crude hop oil raw material is mixed with 1000 ml butane at a temperature of −20° C. Once everything has been mixed the solution is then filtered to remove the solid components from the extract. The extract is then slowly heated to 25° C. to remove all of the solvent. The extract is then mixed with 1000 ml of ethanol and processed through wiped film distillation, which is run at 70° C. and under a vacuum of about 25 torr to further remove any remaining lipids, waxes, flavonoids, and plant matter.

Example 3: Reduction of Myrcene Content in Hop Oil

Figure 1:
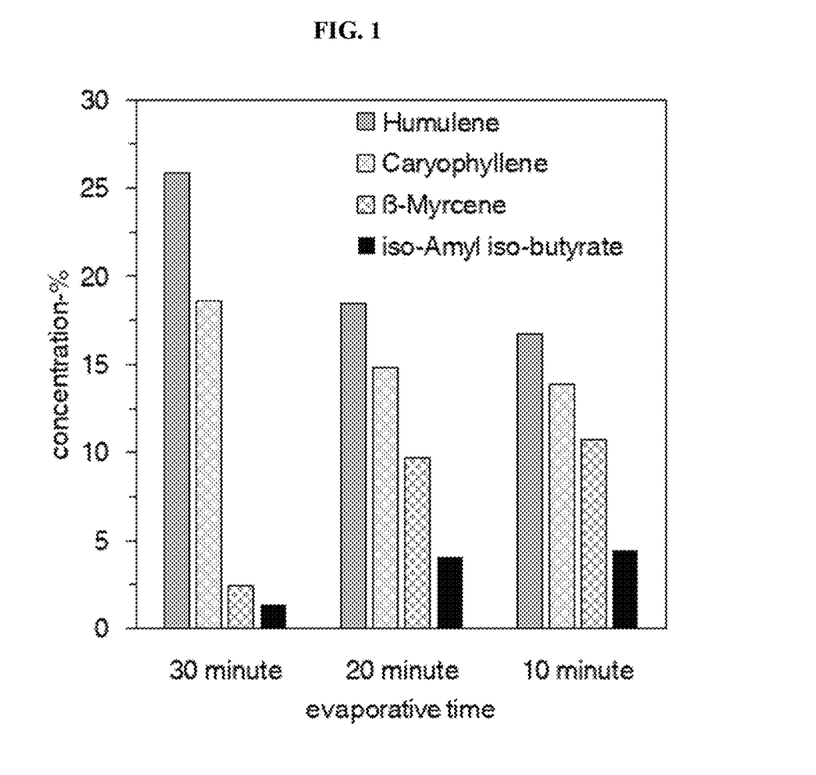
FIG. 1 is a bar graph showing changes in the concentration of selected hop oil compounds as a function of evaporative purge time following the purification method according to an embodiment of the present technology.
Figure 2:
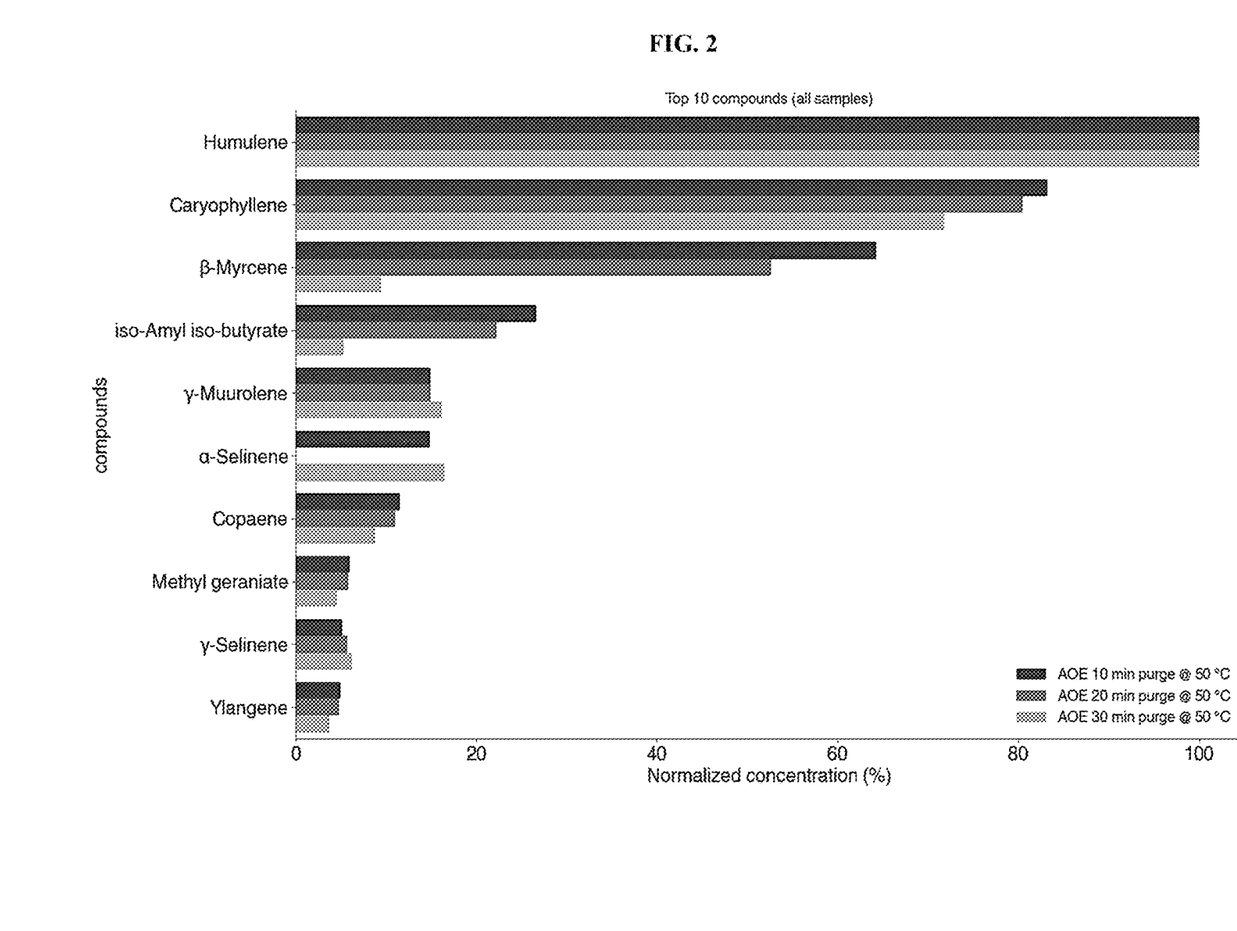
FIG. 2 is a graph showing normalized concentrations of major aroma compounds between hop oils prepared under different conditions.

The hop oil mixed with ethanol (post filtration) from Example 2 was concentrated using a rotary evaporator at 50° C., under vacuum (about 0.001 torr) at 3 different time intervals to remove ethanol and myrcene. Samples were collected on three different timed experiments at minutes, 20 minutes, and 30 minutes. The results are as shown in FIG. 1 and FIG. 2. FIG. 1 shows changes in the concentration of selected hop oil compounds, namely myrcene, humulene, caryophyllene, and iso-amyl iso-butyrate, as a function of evaporative purge time following the purification method. FIG. 2 shows normalized concentrations of major aroma compounds between hop oils prepared under different conditions. Longer purge times result in selective reduction of less volatile compounds such as β-Myrcene and iso-Amyl iso-butyrate. It was observed that the myrcene levels not only systematically decrease with longer experimental times, but they also decrease at a higher rate than most of the other compounds found in the hop oil. The caryophyllene levels decrease systematically as well but at a much lower rate than myrcene, as do most compounds, indicating that myrcene was selectively reduce with minimal impact on other components. Using this method, myrcene, which can be desirable, or sometimes deemed as undesirable in some beers due to its bitter flavor, can effectively be reduced to a point of which the levels are more palatable to the brewer and consumer, if not removed entirely.

Example 4: Reduction of Myrcene Content in Hop Oil 1200 ml of crude hop oil raw material is centrifuged at 4000 rpm for 30 minutes at ambient temperature. After centrifugation, the supernatant is separated from the precipitate and removed. The supernatant fraction is then processed through wiped film distillation, which is run at 70° C. temperature and 25 torr-vacuum, which yields 15% of hop oil product with a relative myrcene content of 75.95% (i.e. weight percent of myrcene in the total hop oil content that has been purified).

Example 5: Reduction of Myrcene Content in Hop Oil

The procedure described in Example 4 was repeated but the distillation temperature was modified to 100° C., which resulted in 24% yield of hop oil product having 57.21% relative myrcene content.

Example 6: Reduction of Myrcene Content in Hop Oil

The procedure described in Example 4 was repeated but the distillation temperature was modified to 115° C., which resulted in 27% yield of hop oil product having 53.23% relative myrcene content.

Example 7: Reduction of Myrcene Content in Hop Oil

The procedure described in Example 4 was repeated but the distillation temperature was modified to 130° C., which resulted in 35% yield of hop oil product having 41.57% relative myrcene content.

Figure 3:
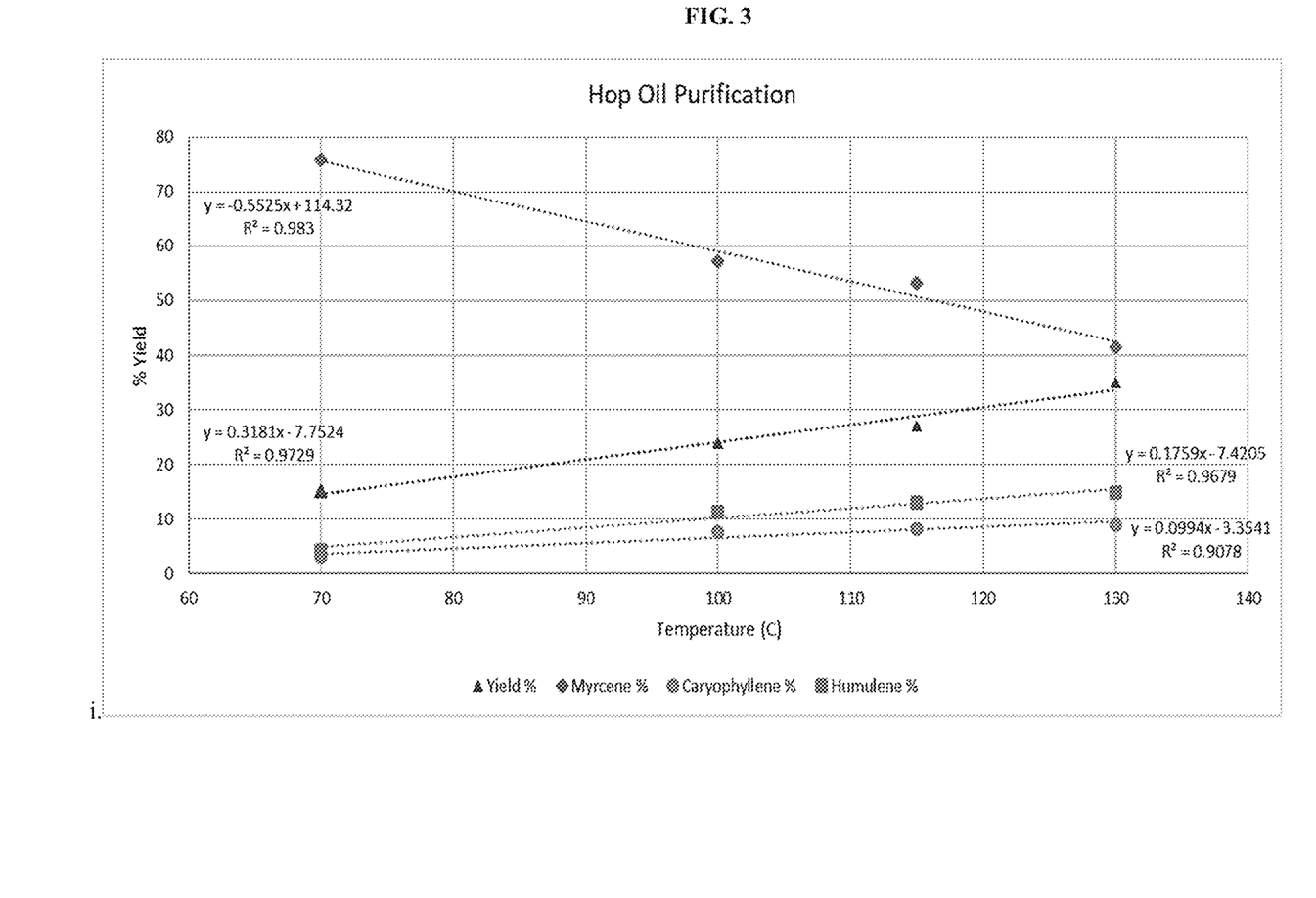
FIG. 3 is a graph showing the % yield of purified hop oil and relative of myrcene, caryophyllene, and humulene as a function of temperature obtained according to an embodiment of the present technology.

FIG. 3 shows the % yield of purified hop oil and relative content (i.e. weight percent in the total oil content that has been purified) of myrcene, caryophyllene, and humulene as a function of temperature obtained according to the methods described in Examples 4-7.

Example 8: Reduction of Myrcene Content in Hop Oil

The double distillation procedure described in Example 1 was repeated by modifying the second distillation temperature. In particular, second distillation temperatures of 100° C., 115° C. and 130° C. were studied, which resulted in similar yields and reduction in relative myrcene content of hop oil product, as was observed for Examples 5-7.

Example 9: Testing and Results

Hop oil was analyzed via gas chromatography mass spectrometry before and after the purification method described in Examples 2-8. As seen in Table 1, the volatile organic compound (VOC) percentage increased significantly demonstrating that the flavor/aroma portion of the hop oil was increased after removal of fats, lipids, and other insoluble large molecules.

TABLE 1

Raw, unrefined oil; refined oil; and their respective aroma contents.

| Sample | VOC content (w/w %) |
|---|---|
| Raw unrefined hop oil | 10.19% |
| Butane-refined hop oil | 14.32% |

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth). Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member. Thus, for example, a group having 1-3 layers refers to groups having 1, 2, or 3 layers. Similarly, a group having 1-5 layers refers to groups having 1, 2, 3, 4, or 5 layers, and so forth.

The drawings shall be interpreted as illustrating one or more embodiments that are drawn to scale and/or one or more embodiments that are not drawn to scale. This means the drawings may be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that may be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "technology," etc., are not meant to invoke exception (b) or otherwise restrict the scope of the recited claim terms. Other than situations where exception (b) applies, nothing contained in this document should be considered a disclaimer or disavowal of claim scope.

Unless otherwise defined, all terms (including technical and scientific terms) used herein have the same meaning as commonly understood by one of ordinary skill in the art to which this technology belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. While not explicitly defined below, such terms should be interpreted according to their common meaning.

In addition, where features or aspects of the disclosure are described in terms of Markush groups, those skilled in the art will recognize that the disclosure is also thereby described in terms of any individual member or subgroup of members of the Markush group.

Unless the context indicates otherwise, it is specifically intended that the various features of the technology described herein may be used in any combination. Moreover, the disclosure also contemplates that in certain embodiments, any feature or combination of features set forth herein may be excluded or omitted. To illustrate, if the specification states that a complex comprises components A, B and C, it is specifically intended that any of A, B or C, or a combination thereof, may be omitted and disclaimed singularly or in any combination.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified. The expression "comprising" means "including, but not limited to." Thus, other non-mentioned substances, additives, carriers, or steps may be present.

Unless explicitly indicated otherwise, all specified embodiments, features, and terms intend to include both the recited embodiment, feature, or term and biological equivalents thereof.

All patents, patent applications, provisional applications, and publications referred to or cited herein are incorporated by reference in their entirety, including all figures and tables, to the extent they are not inconsistent with the explicit teachings of this specification.

Other embodiments are set forth in the following claims.

What is claimed is:

1. A method of purifying a hop raw material, the method comprising:
    subjecting the hop raw material to a first processing step to form a hop oil extract having less than 5 wt. % of lipids, waxes, flavonoids, and plant matter;
    collecting the hop oil extract; and
    subjecting the hop oil extract to a second processing step to yield a purified hop oil product,
    wherein the first processing step comprises subjecting the hop raw material to a distillation selected from the group consisting of wiped film distillation, rolled film distillation, and falling film distillation;
    wherein the distillation is conducted at a temperature of about 60° C. to about 120° C.

2. The method of claim 1, wherein the second processing step comprises one or more of distillation, filtration, evaporation, extraction, centrifugation, and fractionation.

3. The method of claim 2, wherein the second processing step comprises wiped film distillation.

4. The method of claim 3, wherein the wiped film distillation is conducted at a temperature of about 35° C. to about 150° C.

5. The method of claim 1, wherein the hop oil extract and/or the purified hop oil product has a higher purity of at least one terpene compared to the hop raw material.

6. The method of claim 1, wherein the hop oil extract and/or the purified hop oil product has a lower content of at least one terpene compared to the hop raw material.

7. The method of claim 6, wherein the at least one terpene comprises myrcene, humulene, or caryophyllene.

8. The method of claim 1, wherein the hop oil extract and/or the purified hop oil product comprises a flavor component, an aroma component, or both a flavor and an aroma component.

9. The method of claim 1 further comprising blending the hop oil extract and/or the purified hop oil product with a terpene, a terpenoid, or both a terpene and a terpenoid.

10. The method of claim 9, wherein the terpene or terpenoid comprises α-bisabolol, borneol, camphene, camphor, β-caryophyllene, γ-3-carene, caryophyllene oxide, α-cedrene, β-eudesmol, fenchol, geraniol, guaiol, α-humulene, isoborneol, limonene, linalool, menthol, myrcene, nerol, cis-ocimene, trans-ocimene, α-phellandrene, α-pinene, β-pinene, sabinene, α-terpinene, α-terpineol, terpinolene, α-guaiene, elemene, farnesene, germacrene, guaiol, pinanol, selina-3,7 (11)-diene, eudesm-7 (11)-en-4-ol, or valencene.

11. A method of modulating the content of one or more terpenes in a hop raw material, the method comprising:
    subjecting the hop raw material to a first processing step to form a hop oil extract having less than 5 wt. % of lipids, waxes, flavonoids, and plant matter;
    collecting the hop oil extract; and
    subjecting the hop oil extract to a second processing step to yield a purified hop oil product;
    wherein the first processing step comprises subjecting the hop raw material to a first distillation selected from the group consisting of wiped film distillation, rolled film distillation, or falling film distillation;
    wherein the first distillation is conducted at a temperature of about 60° C. to about 120° C.; and
    wherein the second processing step comprises subjecting the hop oil extract to wiped film distillation or rotary evaporation.

12. The method of claim 11, wherein the one or more terpene comprises myrcene.

13. The method of claim 11, wherein the wiped film distillation in the second processing step is conducted at a temperature of about 35° C. to about 150° C.

14. The method of claim 11, further comprising mixing the raw hop material with a solvent prior to the first processing step.

15. The method of claim 14, further comprising removing the solvent by rotary evaporation at a temperature of between about 30° C. to about 50° C. for a period of about 10 minutes to about 30 minutes.

* * * * *